US008836792B1

(12) United States Patent
Butler

(10) Patent No.: US 8,836,792 B1
(45) Date of Patent: Sep. 16, 2014

(54) ACTIVE CLOAKING WITH TRANSDUCERS

(75) Inventor: John L. Butler, Cohasset, MA (US)

(73) Assignee: Image Acoustics, Inc., Cohasset, MA (US)

( * ) Notice: Subject to any disclaimer, the term of this patent is extended or adjusted under 35 U.S.C. 154(b) by 121 days.

(21) Appl. No.: 13/116,353

(22) Filed: May 26, 2011

Related U.S. Application Data

(60) Provisional application No. 61/422,307, filed on Dec. 13, 2010.

(51) Int. Cl.
*H04N 5/33* (2006.01)

(52) U.S. Cl.
USPC ........................................................ 348/163

(58) Field of Classification Search
USPC ........................................................ 348/163
IPC ...................................................... H04N 53/00
See application file for complete search history.

(56) References Cited

U.S. PATENT DOCUMENTS

| | | | |
|---|---|---|---|
| 3,721,949 A * | 3/1973 | Hubbard et al. | 367/1 |
| 4,227,110 A * | 10/1980 | Douglas et al. | 310/316.01 |
| 4,300,215 A * | 11/1981 | Jones | 367/11 |
| 4,332,986 A | 6/1982 | Butler | |
| 4,742,499 A | 5/1988 | Butler | |
| 4,754,441 A | 6/1988 | Butler | |
| 4,845,688 A | 7/1989 | Butler | |
| 4,864,548 A | 9/1989 | Butler | |
| 5,047,683 A | 9/1991 | Butler et al. | |
| 5,184,332 A | 2/1993 | Butler | |
| 6,052,335 A * | 4/2000 | Korolenko | 367/121 |
| 6,734,604 B2 | 5/2004 | Butler et al. | |
| 6,950,373 B2 | 9/2005 | Butler et al. | |
| 7,106,656 B2 * | 9/2006 | Lerro et al. | 367/99 |
| 7,292,503 B2 | 11/2007 | Butler et al. | |
| 7,372,776 B2 | 5/2008 | Butler et al. | |
| 7,453,186 B1 | 11/2008 | Butler et al. | |
| 7,692,363 B2 | 4/2010 | Butler et al. | |
| 2005/0088916 A1 * | 4/2005 | Zhu et al. | 367/134 |
| 2010/0094152 A1 * | 4/2010 | Semmlow | 600/528 |
| 2011/0007606 A1 * | 1/2011 | Curtis | 367/103 |

* cited by examiner

*Primary Examiner* — Tung Vo

(74) *Attorney, Agent, or Firm* — David M. Driscoll, Esq.

(57) ABSTRACT

Electro-mechanical transducers are used to actively cloak a targeted object in a way that absorbs incoming waves without reflection, sends them out the opposite side of the target and returns the wave without leaving a shadow behind the target. The present invention pertains to an improvement in the cloaking of an object without requiring the use of special materials for the object itself and allows the use of SONAR and other possible transducer systems that would be covered and rendered ineffective with passive cloaking materials.

21 Claims, 8 Drawing Sheets

Fig 3d Resonance Condition

Fig 3c Thevenin Reduction

ACTIVE CLOAKING WITH TRANSDUCERS

FIELD OF THE INVENTION

The present invention relates in general to a novel cloaking technique. More particularly, the present invention pertains to an improvement in the cloaking of an object without requiring the use of special materials for the object itself.

BACKGROUND OF THE INVENTION

In a typical acoustic cloaking condition the plane waves from a distant enemy sonar source arrive at the object and emerge from the opposite side, reflect or scatter from particles of the medium and any other reflecting objects such as the ocean surface or bottom, and return back to the sonar source as if there were no targeted object in the path of the waves. With passive cloaking the waves appear to bend around the object as if the object were not there. One form of passive cloaking involves the provision of special materials for the object.

There presently exist efforts to develop inactive metamaterials for cloaking spherical (or other shape) shells so as to both eliminate backscattering and fill in the shadow zone behind the shell. An analytical model for this has been given by Cummer et al. ["Scattering Theory Derivation of a 3D Acoustic Cloaking Shell," Phys. Rev. Lett. 100, 024301 (2008)], which develops the case for an ideal spherical shell. The development of such cloaking materials for spherical and other shapes is meant to inhibit the acoustic detection of objects, such as mines, torpedoes, UUV's and, ultimately, submarines by making the object invisible to acoustic waves.

This form of inactive cloaking, however, covers the target in a way that shields the target from using its own acoustic sonar means for detecting the source, unless the cloaking is turned off. Although it may be possible to eventually develop active metamaterials, which could be turned on or off, the present invention proposes an alternative approach.

Accordingly, it is an object of the present invention to provide an active cloaking transducer system which effectively cloaks the target and yet can also be used as a conventional active, acoustic sonar source and receiver.

SUMMARY OF THE INVENTION

In accordance with the present invention there is provided an active transducer cloaking system wherein the targeted object to be cloaked is covered by a transducer array of elements that are preferably small and light in weight compared to the object. In an active cloaking transducer system, in accordance with the present invention, the acoustic waves that strike the object are absorbed by the transducers with no reflection, are passed through the object electrically and emerge acoustically from the opposite side. Reflections from particles in the medium, ocean bottom or surface or additional objects of these emerging waves are then received from the transducers on this opposite side and sent back through the transducers to emerge from the initial side as if there were nothing lost in the forward and backward transmission through the target object. In a sense, the object becomes invisible to the incoming waves and allows them to pass through the object as though it were not there.

It may be appreciated that with transducer cloaking the waves are converted to electrical signals and pass through the target rather than around the target, as in the case of conventional passive cloaking. And it may readily be appreciated that this transducer based cloaking invention may be applied to any system that uses waves, such as radar or optical means.

BRIEF DESCRIPTION OF THE DRAWINGS

Reference is now made to the following drawings for an illustration of a preferred embodiment of the technique of the present invention. Numerous other objects, features and advantages should now become apparent upon a reading of the following detailed description taken in conjunction with the accompany drawings, in which:

FIG. 2a shows the set up using two connected piezoelectric transducers, one on either side of the object. FIG. 2b shows an equivalent circuit representation of the two connected transducers of FIG. 2a. FIG. 2c is the equivalent circuit representation at resonance where m and $C_m$ as well as $L_0$ and $C_0$ of FIG. 2b cancel and only resistances are left in the circuit.

FIGS. 3a, 3b, 3c, 3d are respective illustrations of means for eliminating resistive losses in the equivalent circuit of FIGS. 2a and 2b. FIG. 3a is an illustration of a modification of the piezoelectric transducers of FIG. 2a, which allows an additional signal, $V_x$, to be injected into the transducers at the terminal of a transducer element to replace any power loss due to inefficiencies. FIG. 3b is an equivalent circuit for the two port device shown in FIG. 3a. FIG. 3c is a Thevenin reduced equivalent circuit for the forces of FIG. 3b. FIG. 3d is the Thevenin reduced circuit of FIG. 3c at resonance.

FIG. 4 may also be modified to include transducers with two ports, as in FIG. 3a, allowing one of the ports of each transducer to be used as a built in hydrophone receiver instead of the separate hydrophones $H_1$ and $H_2$.

DETAILED DESCRIPTION

Figure 1A:
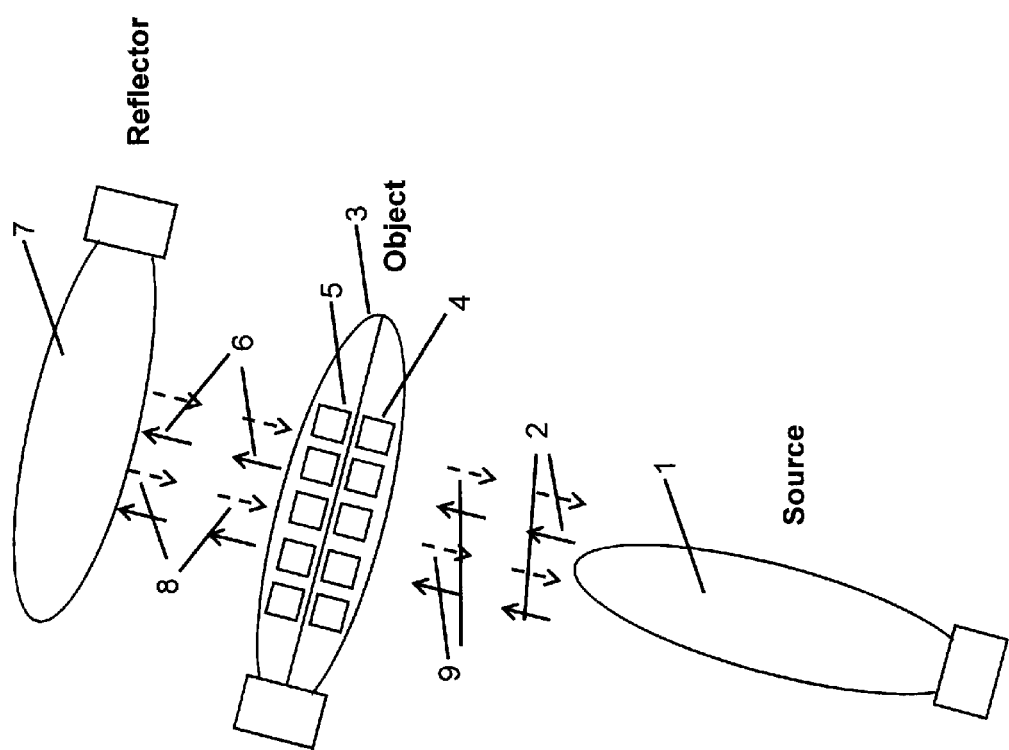
FIG. 1a. Is an illustration of an active transducer cloaking system of the present invention showing a transducer array of transducer projectors, 4 and 5, on both sides of the targeted object, a possible reflector along with a source of incident acoustic wave fronts, as solid lines, and returning wave fronts, as dashed lines.
Figure 1B:
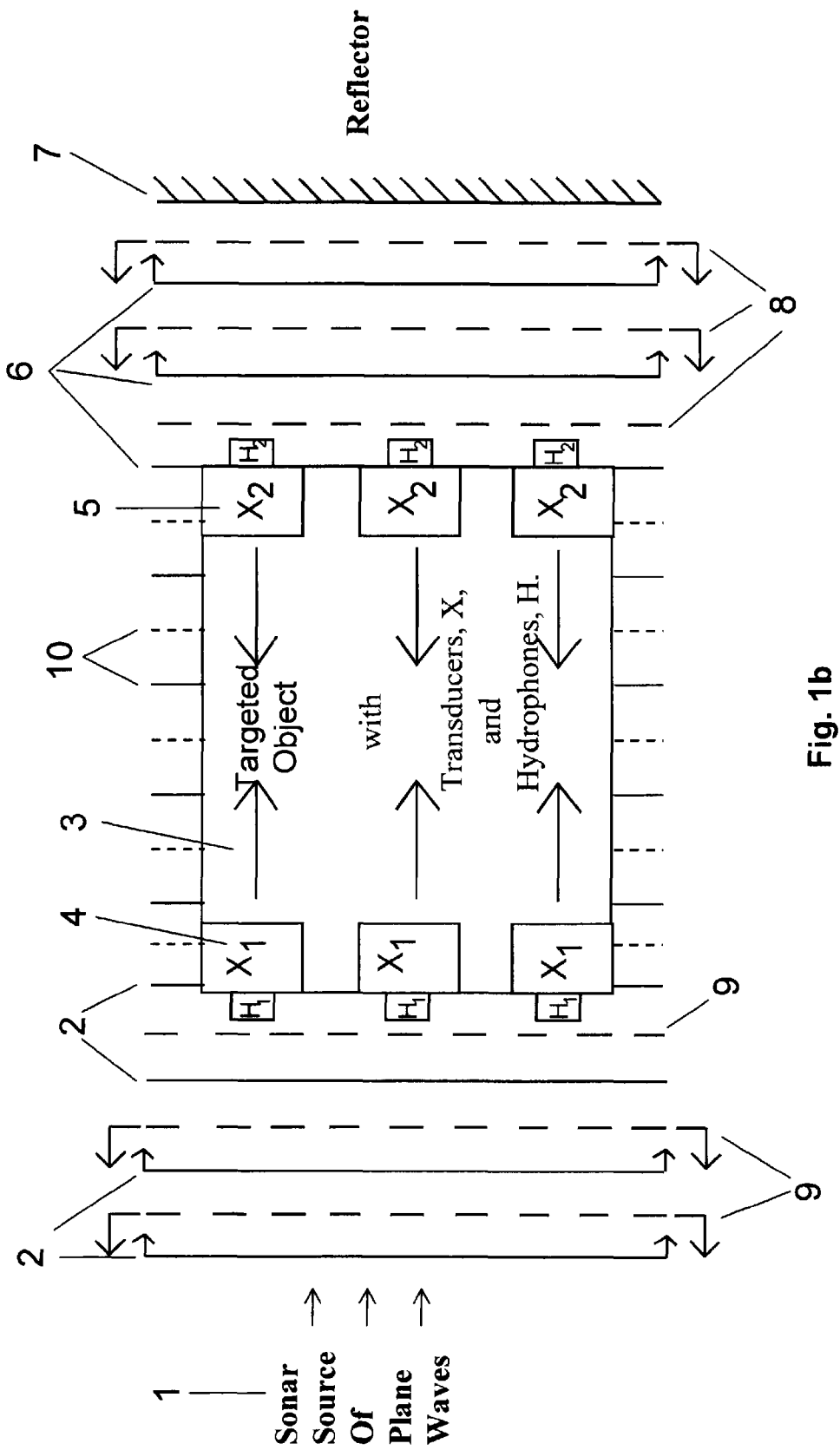
FIG. 1b. Is a schematic illustration of an active transducer cloaking system of the present invention showing a small transducer array of transducer projectors, $X_1$ and $X_2$, and Hydrophones, $H_1$ and $H_2$, on both sides of the targeted object, such as a submarine, along with a source of incident acoustic wave fronts, as solid lines, and returning wave fronts, as dashed lines.

Reference is now made to FIG. 1a where arrows are the normal to the wave fronts and FIG. 1b where the waves from the sonar source 1, illustrated by the wave front (solid lines) 2, arrive at the targeted object 3, are absorbed by transducers 4 (without creating reflections), are passed through to transducers 5, retransmitted from the opposite side as wave front (solid lines) 6, arrive at a possible reflection 7, pass back as wave front (dashed lines) 8, pass on through the targeted object 3 and emerge as wave front (dashed lines) 9 from transducers $X_1$, as if the targeted object were not there. Note that in the FIG. 1b schematic illustration the portion of the wave that passes through the targeted object is also timed to emerge at the same time as the portion of the wave 10 passes around on the outside of the target object 3. In FIGS. 1a and 1b the solid lines indicate the waves entering and the dashed lines indicate the waves returning.

Figure 2A:
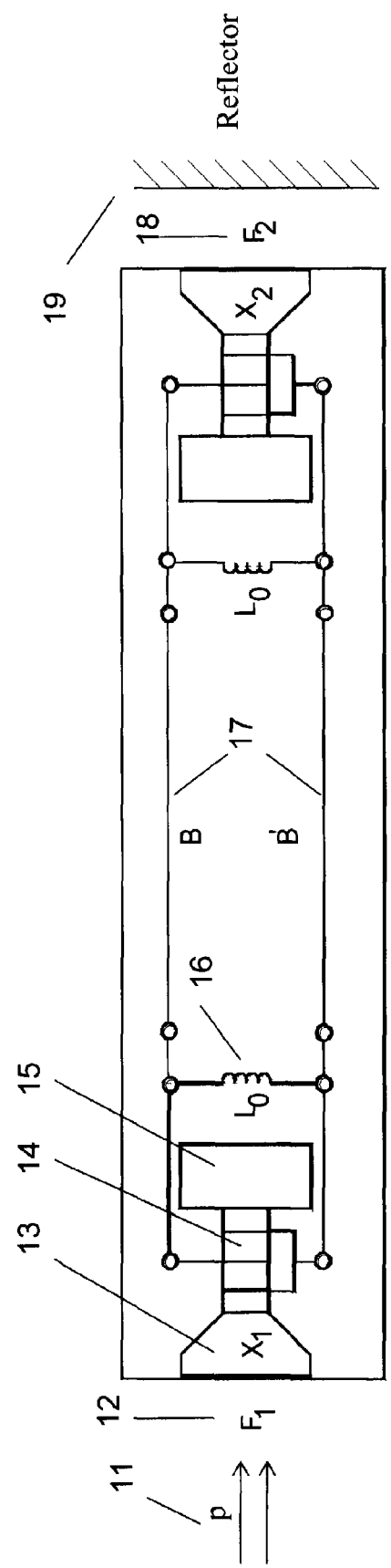
FIGS. 2a, 2b, 2c. are respective illustrations of a pure transduction system which accomplishes active cloaking by means of an array of reciprocal transducers which act as both sound projectors and receiving hydrophones.
Figure 2B:
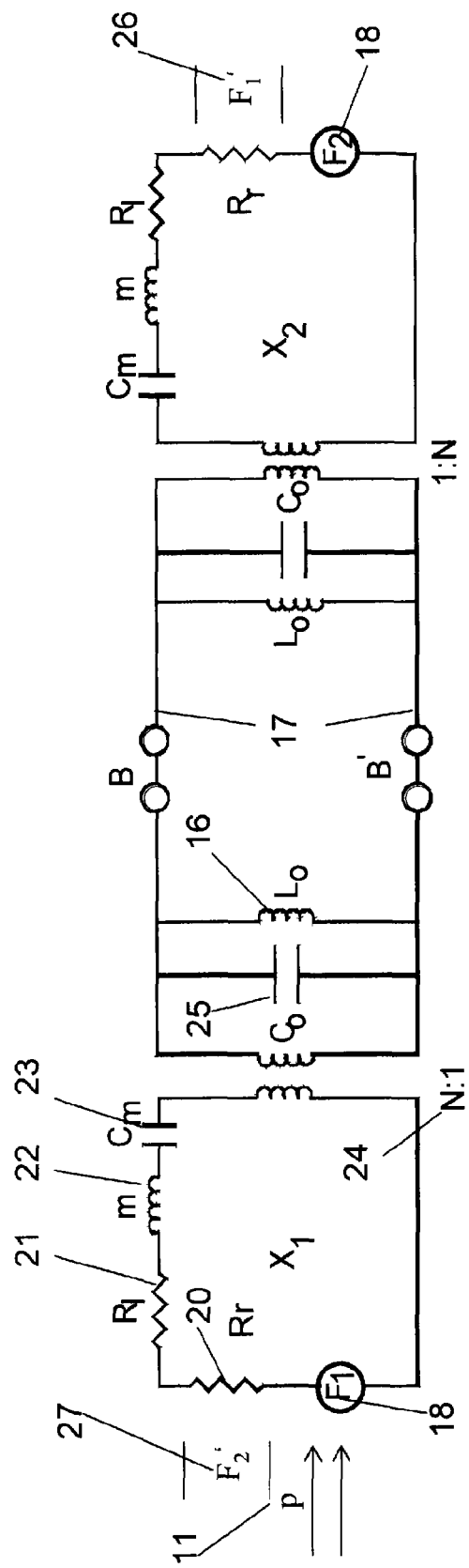
Figure 2C:
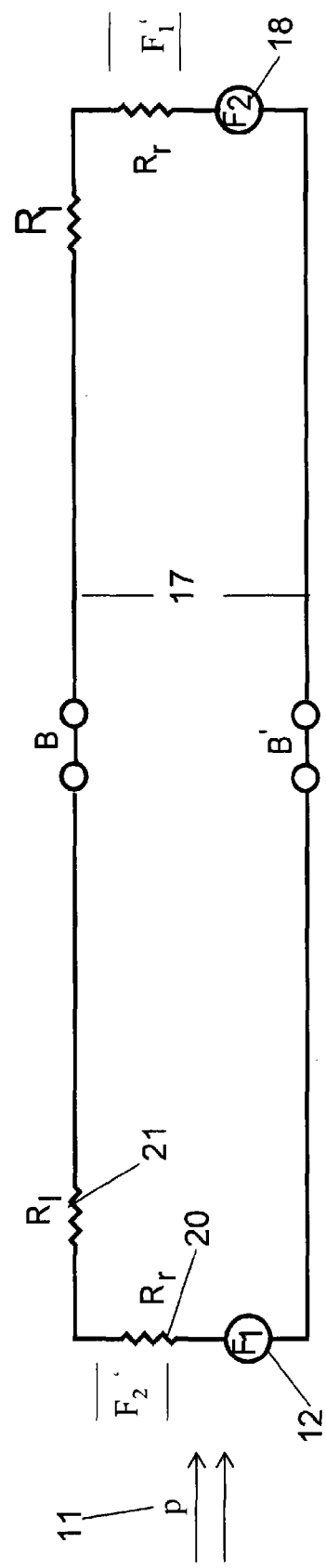

Refer now to FIGS. 2a, 2b and 2c which illustrate the transducer invention without the use of hydrophones, amplifiers or equalizers. This embodiment would have application where time delays are not significant and can be ignored as in the case of a small target. FIG. 2a shows a scheme for active cloaking illustrating a physical port-starboard arrangement about the targeted object. FIG. 2b is an illustration of the corresponding electrical equivalent circuit where $F_1$ is input force and $F_2$ is the return force after reflection. FIG. 2c is the equivalent circuit of FIG. 2b at resonance.

Consider FIG. 2a which illustrates the case where no hydrophones or amplifiers are used within the targeted object and only reversible matched transducers, electrically connected at B and B', are used. The condition is illustrated in FIG. 2a by, for example, two piezoelectric Tonpilz type piston transducers including a first transducer $X_1$ receiving an acoustic pressure, p, 11 producing a force, $F_1$, 12 on the piston head mass 13, connected to a piezoelectric stack of elements 14, large tail mass 15, electrical tuning inductor, $L_0$, 16 and interconnecting wires 17 along with a possible reflector 19 producing a force, $F_2$, 18 on the second Tonpilz type piston transducer $X_2$. If the tail mass 15 is much larger than the head mass, m, 13, the equivalent circuit simplifies to the circuit shown in FIG. 2b for the two transducers $X_1$ ad $X_2$ with head mass, m, 22, short circuit compliance, $C_m$, 23, clamped capacitances, $C_o$, 25, and electro mechanical ideal transformer turns ratio, N, 24. The inductor $L_0$ is used to shunt tune capacitance $C_0$ at mechanical resonance $f_r = \frac{1}{2}\pi(mC_m)^{1/2}$. In this circuit $F_1$ is the input force 18 from the SONAR acoustic signal pressure, 11, of pressure p, and here the radiation resistance, $R_r$, is 20 and the mechanical loss resistance, $R_l$, is 21. The input wave free field pressure, p is 11, the piston area is A and the plane wave diffraction constant is 2, resulting in an input transducer piston driving force $F_1 = 2pA$. In this teaching and for simplicity we consider piston transducers with large tail masses and planar arrays of these transducers. If the array or transducer are not planar, $F_1 = pAD_f$, where $D_f$ is the diffraction constant.

The equivalent circuit of FIG. 2b is used to show that the transducer pair may be used to present an impedance value which is matched to the medium; thus, exhibit no reflection, pass the wave through the targeted object and return the wave from any possible reflector, as if the targeted object were not there in the path of the wave. FIG. 2b is used as a basis for calculating, $F_1'$, the output force, 26, and corresponding wave pressure $p' = F_1'/A$ for an input force $F_1 = 2pA$, and for identical transducer $X_1$ and $X_2$, the result may be written as $$F_1' = 2pAR_r/(2Z+Z^2/Z_0) = pAR_r/Z(1+Z/2Z_0) \quad (1)$$

where $$Z = R_r + R_l + j(\omega m - 1/\omega C_m) \quad (2)$$

and $$1/Z_0 = [1/R_0 + j(\omega C_0 - 1/\omega L_0)][2/N^2] \quad (3)$$

A loss resistor, $R_0$ has been added in Eq. (3) to represent the electrical dissipation in each transducer. This resistive loss is typically written as $1/R_0 = \omega^f \tan \delta$ where $C_f$ is the free capacitance. The quantity $\tan \delta$ is the electrical dissipation factor which is usually a small number less than 0.01 and, consequently, $R_0$ is typically very large.

At resonance, $\omega_r = 2\pi f_r$, and where $L_0$ is chosen to tune out capacitance $C_0$ $$\omega_r^2 = 1/mC_m = 1/L_0C_0 \quad (4)$$

and Eq. (1) becomes $$F_1' = pAR_r/(R_r+R_l)[1+(R_r+R_l)/R_0N^2] \quad (5)$$

Since $R_0$ is normally very large, Eq. (5) may be written as $$F_1' \approx pA\eta \quad (6)$$

where the mechanical efficiency $\eta = R_r/(R_r+R_l)$. The output pressure is; therefore, $F_1'/A = p\eta$ and, consequently, the transducer translates the incoming pressure right through the transduction system and sends it out on the opposite side as the same pressure reduced by the efficiency. At resonance the corresponding transducer circuit would be reduced to resistive components: loss resistors $R_l$ and radiation resistances $R_r$, illustrated by the all resistive equivalent circuit in FIG. 2c.

If operating at resonance, and the losses are negligible, the output force $F_1' \approx pA$ and the input pressure wave, p, would travel through the system and exit as a wave with pressure p with no reflection at the input of transducer $X_1$. This pressure wave would then bounce off the illustrated reflector at some reduced pressure value, p', become the input force here as $F_2 = 2p'A$ and arrive back to the input side by exiting from transducer $X_1$ with $F_2' = p_2'A$. This force and reflected pressure, $p_2'$, is the same as would be obtained without the targeted object in place, and thus, with transducer cloaking the targeted object becomes invisible.

The resistive circuit of FIG. 2c may be used to calculate the input impedance of the transducer system. If there is to be no reflection from the targeted object, the invention presents an impedance equal to the wave impedance $p/u = \rho c$, where p is the free field pressure, u is the wave particle velocity, c is the sound speed of the medium and $\rho$ is the density of the medium. The transducer input mechanical impedance is thus $$F_1/u = 2pA/u = 2(R_r+R_l) = 2R_r/\eta = 2A\rho c/\eta \quad (7)$$

and since $F_1 = 2pA$ we get $p/u = \rho c/\eta$. If the efficiency were 100% we would have an exact match. For an efficiency of 90% the impedance would be 10% higher than $\rho c$.

This resistively matched system occurs at resonance and a low Q design is desired for wideband response. Theoretically, if one of the transducers had components that were complex conjugate matches to the other, they would cancel each other, there would be no need for $L_0$ and the transducer pair would be resistive over an extremely wide band. The goal would be to approach a wide band condition. And this could best be achieved with single crystal piezoelectric material, especially with the improved power factor and lower electrical and mechanical impedance. The transducers could also be readily used as part of a sonar system with sonar amplifiers switched in at BB'.

Figure 3B:
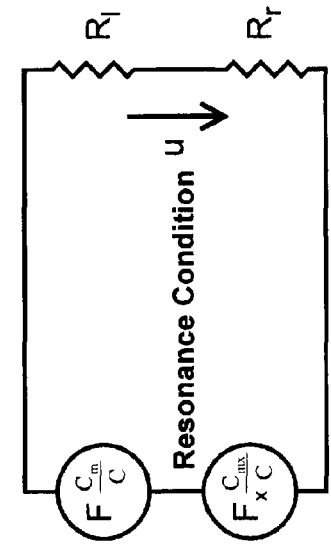
Figure 3B:
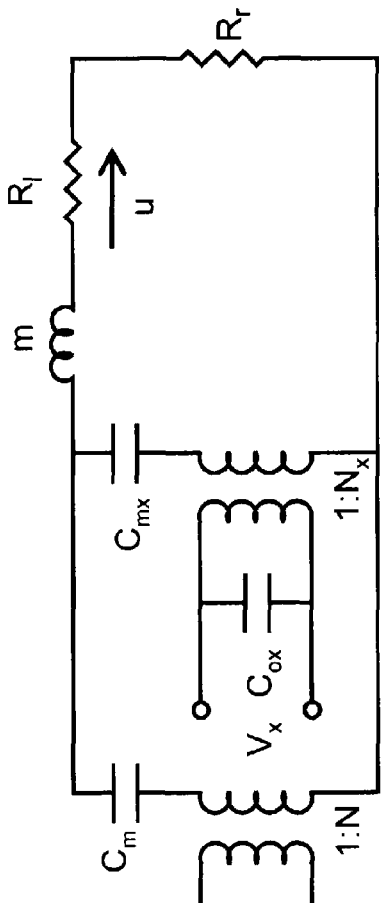
Figure 3A:
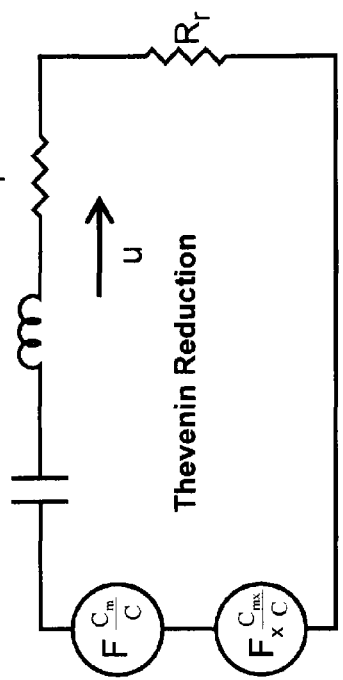
Figure 3A:
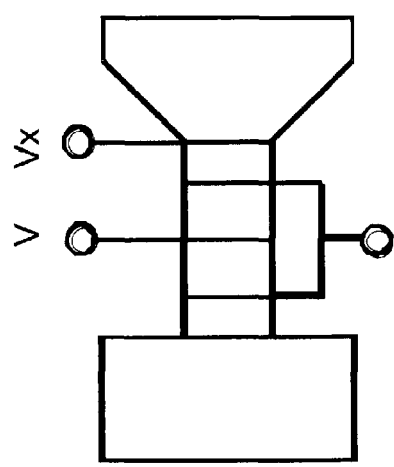

In reality there will be losses with reduced output and somewhat miss-matched impedance. There will also be losses in the metamaterial passive cloaking case; however, in this transduction invention case it may be possible to inject power into the system using small amplifiers to make up for the losses. This could be done without affecting the direct wiring connection between the transducers on opposite sides of the targeted object. And it is possible to introduce a voltage that will effectively cancel the losses occurring in the loss resistance, $R_l$, of FIGS. 2b and 2c. One method is to add a small independent additional piezoelectric material between the main piezoelectric stack and the piston and drive it with a voltage $V_x$ as shown in FIG. 3a. The equivalent circuit for this additional input is shown in FIG. 3b with a voltage V as part of the BB' wired system of FIG. 2b while the additional voltage $V_x$ is to be used to mitigate the loss resistance, $R_l$. The velocity is u and the voltages V and $V_x$ produce forces F and $F_x$ through the electro-mechanical transformer ratios N and $N_x$ in the form:

$$F=NV \text{ and } F_x=N_x V_x \tag{8}$$

This circuit may be simplified by use of Thevenin's Theorem with the representation shown in FIG. 3c with the total compliance $C=C_m+C_{mx}$. This circuit can be further simplified at resonance, where $\omega_r^2=1/mC$, as illustrated in FIG. 3d.

It will be shown that the loss resistance, represented by $R_l$ can be effectively canceled by introducing a voltage $V_x=F_x/N_x$. Consider first the resistive resonant circuit where $R_l=0$, $F_x=0$ and the velocity in the circuit is now $u_r$ and is only dependent on $R_r$ and the source force $FC_m/C$ so that here $$u_r=(FC_m/C)/R_r \tag{9}$$

If we now simultaneously introduce both $F_x$ and $R_l$ so the loss $u_r R_l$ is equal to the rise $F_x C_m/C$; thus, effectively cancelling $u_r R_l$, we also have $$u_r=(F_x C_{mx}/C)/R_l \tag{10}$$

Equating Eq. (9) and Eq. (10), we get the required value for $F_x$ to cancel $R_l$, given as $$F_x=F(C_m/C_{mx})(R_l/R_r) \tag{11}$$

Equation (11) becomes a relation for voltages through V=F/N and $V_x=F_x/N_x$ yielding $$V_x=V(N/N_x)(C_m/C_{mx})(R_l/R_r) \tag{12}$$

Since the electromechanical turns ratios $N=dC_m$ and $N_x=dC_{mx}$ where d is the piezoelectric "d" constant and since $R_l/R_r=(1/\eta-1)$ where the mechanical efficiency $\eta=R_r/(R_r+R_l)$, we may finally write $$V_x=VR_l/R_r=V(1/\eta-1) \tag{13}$$

Equation (13) shows, quite simply, that the required added voltage to cancel out the effect of the loss resistance is simply related to the efficiency. For $\eta=1$ (i.e. 100% efficiency), $V_x=0$, $\eta=0.9$ (i.e. 90% efficiency) $V_x=0.11$ while for $\eta=0.5$ (i.e. 50% efficiency) $V_x=V$.

The quantity $F_x$ or the voltage $V_x$ of FIG. 3d will cancel out the loss resistance $R_l$. That is, the two forces F and $F_x$ (induced by the voltages V and $V_x$) together create a velocity $u_r=FC_m/CR_r$ just as though the resistor $R_l$ were not part of the circuit. In a sense, the additional source $F_x C_{mx}/C$ cancels out the force $u_r R_l$ so that $R_l$ no longer appears operative. The addition of this new transducer input port would require a small amplifier and a means of sampling the incoming or transported signal. This might be done from within the electrical circuit connecting opposite transducers at BB' or with a small array of additional hydrophones as indicated in FIG. 1. We note that procedure may also be used to compensate for reactive components $C_m$ and m at frequencies off resonance.

Figure 4:
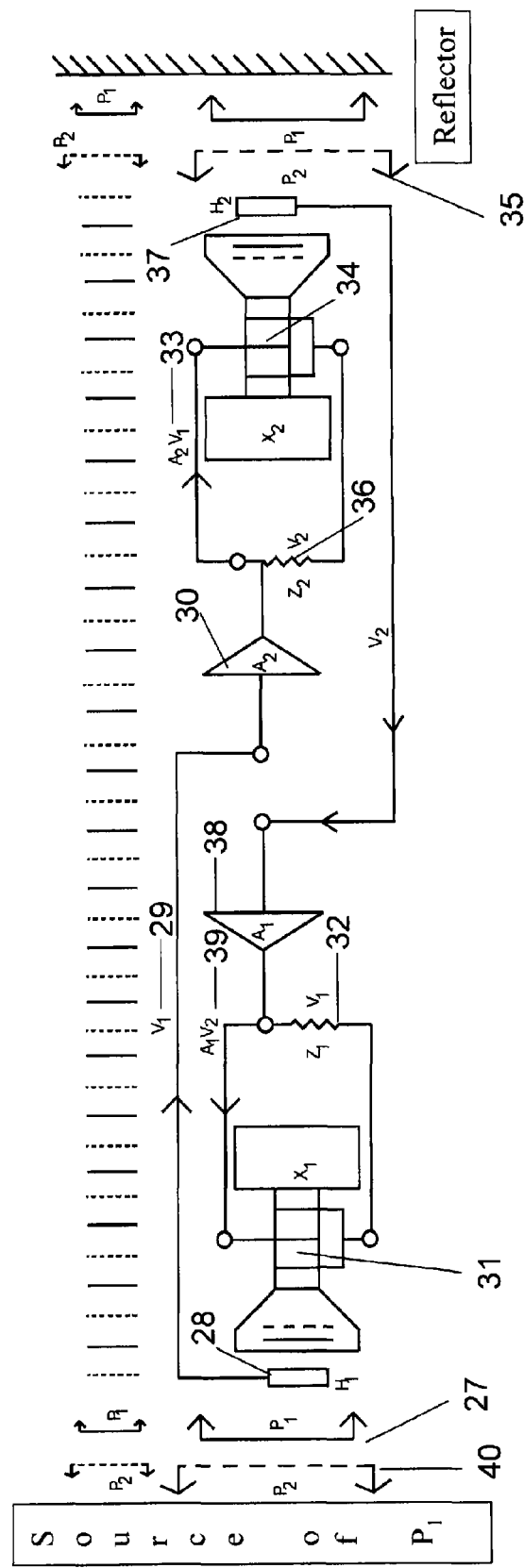
FIG. 4 Is an illustration of transducer cloaking using separate hydrophone means allowing amplification, equalization and time delay so that the system can obtain an exact match to the reflected wave (illustrated above the transducers), and is an illustration using two separate hydrophones that are amplified and processed by amplifiers $A_1$ and $A_2$.

Consider now an alternative transducer cloaking approach, shown in FIG. 4, which illustrates the function of the wide band transducers, $X_1$ and $X_2$, now along with hydrophones, $H_1$ and $H_2$, and amplifiers, $A_1$ and $A_2$, as part of the targeted object instrumentation. The amplifier electronics allows compensation for transduction loss, provides response equalization and time delay so that the wave through the targeted object arrives in-step with the actual waves propagating next to the targeted object. As the pressure, $P_1$, 27, from the acoustic source arrives, the pressure is detected by the small hydrophone, $H_1$, 28, and sent along as, $V_1$, 29, to the amplifier/equalizer, $A_2$, 30. Meanwhile, the majority of the wave enters the transducer, $X_1$, tuned to the frequency of the sonar source, and is absorbed in the transducer and the matched load, $Z_1$, 32, eliminating any reflection off the piston face. Here transducer $X_1$ and impedance $Z_1$ act as a matched load to the input wave and absorb the incoming wave inhibiting reflections. In this alternative case the wave is absorbed in an electrical load on the incident transducer while in the previous case the wave is translated to the opposite side of the object and absorbed into the medium on the opposite side of the object. The signal from hydrophone $H_1$ after amplifier $A_2$ is, $A_2 V_1$, 33, which drives transducer, $X_2$, 34, to reproduce the signal $P_1$ as if there were no targeted object in between; that is, as if it were acoustically invisible. This pressure now reflects, scatters or reverberates and arrives back as pressure, $P_2$, 35, is absorbed by transducer $X_2$, 34, and impedance $Z_2$, 36, and a small portion sampled by the hydrophone $H_2$, 37, is amplified and equalized by, amplifier $A_1$, 38, and drives transducer 31, with voltage $A_1 V_2$, 39, reproducing signal $P_2$, 40, which is sent toward the sonar source as if there were nothing between the sonar source and the reflector.

The target has now become completely acoustically invisible,—does not reflect incoming waves and does not leave a shadow. It appears acoustically transparent to incoming waves. Reflecting objects behind it will appear as though there were a clear path between the source and the reflecting objects behind the target. And the system appears as if the wave fronts propagated in the manner illustrated in the upper part of FIG. 4. The hydrophone may be imbedded into the transducer by use of one of the piezoelectric elements of the transducer as a hydrophone, illustrated in the transducer stack scheme of FIG. 3a with $V_x$ now the output voltage. In practice this element would be electrically isolated from the transducer wiring scheme used for transmitting the sound wave and should be positioned for maximum sensitivity. The transducer active cloaking will, in general, require an array of transducers that are phase steered to the incoming signal with corresponding phasing to the reproduced projected signal on the opposite side of the object body. Array curvature may require additional incremental steering to maximize the system performance The essence of the above acoustical system can be appreciated, visualized and applied using an optical active cloaking approach, illustrated in FIG. 5. A light source (like the sonar source), two monitors, $M_1$, 42 and, $M_2$, 43 (like transducers, $X_1$ and $X_2$) and electronic cameras, $C_1$, 44 and $C_2$, 45, (like hydrophones, $H_1$ and $H_2$) are illustrated as part of the targeted object to be cloaked, 46, (like the target submarine). Camera $C_1$ receives the light and illuminates the body of the reflector while camera $C_2$ has a view of the reflector, 47, and displays it on monitor $M_1$. When the system is turned off the targeted object will block the body of the reflector, only the head 50 and legs 51 of the reflector will be seen and the targeted object will be seen as a dark monitor screen along with the shadow of the object. When the system is operating, the eye, 49, (like the enemy sonar receiver) should see the full body 52, head 50 and legs 51 of the reflector, and there will be no shadow and the targeted object, 46, will appear to be transparent and invisible, as in the case of a fully cloaked object.

Figure 5:
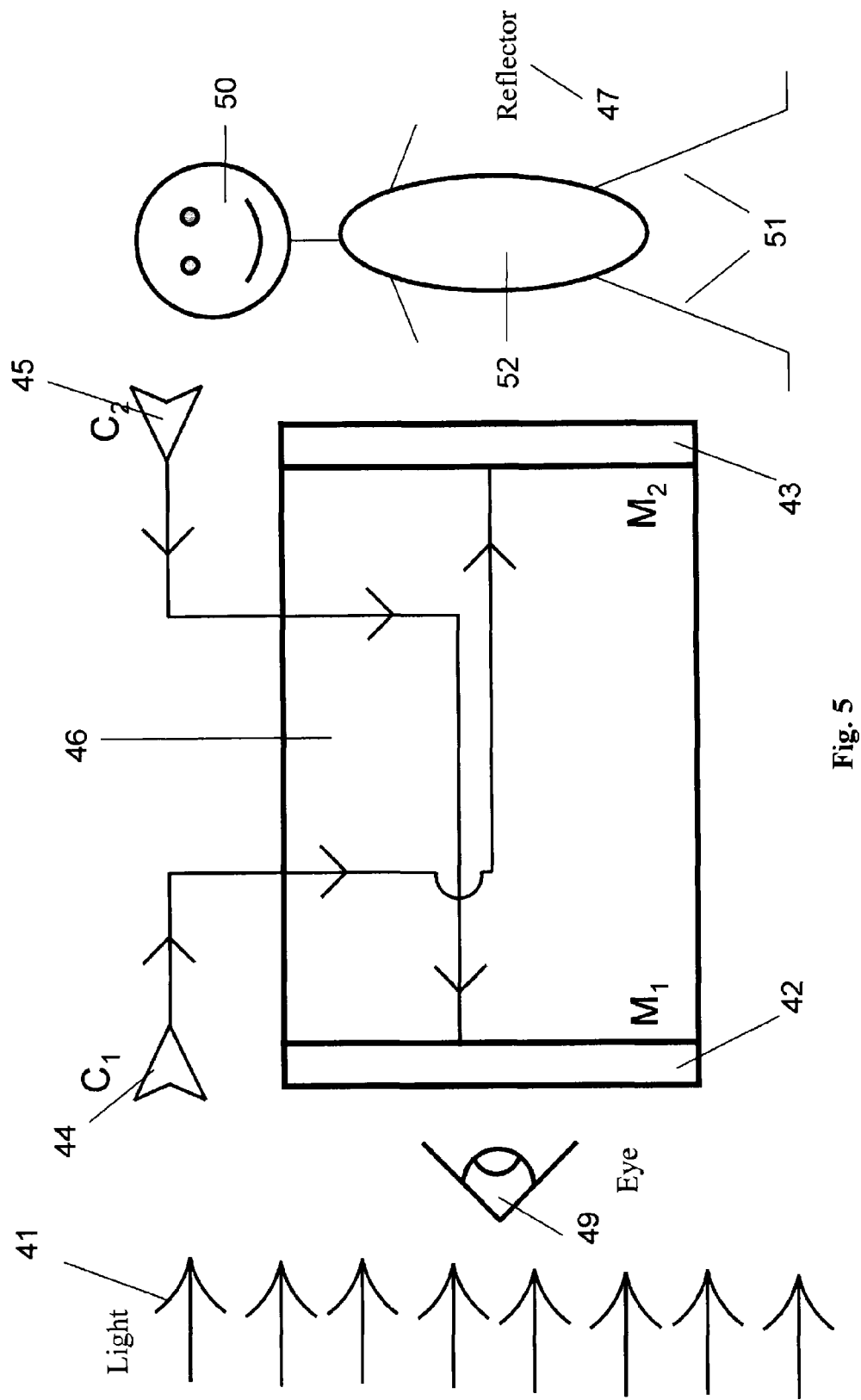
FIG. 5 is an illustration of an analogous optical active cloaking system from the invention illustrated in FIG. 4 but instead using optical monitors $M_1$ and $M_2$ and cameras $C_1$ and $C_2$.

Having now described a limited number of embodiments of the present invention, it should now become apparent to those skilled in the art that numerous other embodiments and modifications thereof are contemplated as falling within the scope of the present invention as defined in the appended claims. Examples of modification would be the use of other transduction devices and materials other than piezoelectric ceramic (e.g. PZT) such as, PVDF. piezoelectric single crystal material, magnetostrictive, electrostriction, variable reluctance or moving coil systems, as well as piezoelectric rings, composites and flextensional transducer designs. Moreover, the invention is not limited to water and may be used in air applications. The invention may be applied as an active cloaking means for electromagnetic waves such as light waves, as illustrated in FIG. 5. Similarly it may be applied to radar waves in radar systems with a different type of transducer, i.e., an antenna which converts air-born electromagnetic waves to electrical signals in (or on) wires and vice versa.

What is claimed is:

1. An electro-acoustic cloaking transducer system including transducer means, said targeted object having front and rear object ends to provide an acoustic transduction cloak on or about the targeted object so that incoming sound passes through the targeted object without reflecting sound from the targeted object and also leaving no acoustic shadow so as to thus be acoustically invisible, said transducer means comprising at least one pair of transducers including front and rear transducers that are positioned on the respective front and rear ends of the targeted object and electrical circuit means disposed on the targeted object and inter-coupling the front and rear transducers, said front transducer positioned at the front end of the targeted object to absorb an impinging wave front and transmit the absorbed wave front via the electric circuit means to said rear transducer, said rear transducer positioned at the rear end of the targeted object for re-transmitting the wave front received from the electric circuit means at the rear end of the targeted object, said circuit means comprising electrical wiring connected between the front and rear transducers providing bi-directional signal transmission between the front and rear transducers, said re-transmitted wave front reflected from a reflector surface for receiving the re-transmitted wave front that is reflected and passes back through the targeted object between the front and rear transducers via said electrical circuit means emerging as a return wave front from the front transducer, as if the targeted object were absent.

2. An acoustic cloaking transducer system as set forth in claim 1 in which the transducer means is used as an integral part of an acoustic SONAR system.

3. An acoustic cloaking transducer system as set forth in claim 1 in which the transducer means is constructed of material from the group of piezoelectric ceramic, PVDF, piezoelectric composite, piezoelectric single crystal, electrostrictive, magnetostrictive, variable reluctance or moving coil.

4. An acoustic cloaking transducer system as set forth in claim 1 that operates in air or in water.

5. An acoustic cloaking transducer system as set forth in claim 1 further including a first hydrophone for sensing the impinging wave to control the rear transducer, and a second hydrophone for sending a reflected wave to control the front transducer.

6. An acoustic cloaking transducer system as set forth in claim 5 wherein the first hydrophone is disposed in front of and adjacent to the first transducer and the second hydrophone is disposed behind and adjacent to the second transducer, both the first hydrophone and first transducer positioned to receive the impinging wave front and both the second hydrophone and second transducer positioned to receive the re-transmitted wave front.

7. An acoustic cloaking transducer system as set forth in claim 6 wherein said electrical circuit means comprises a first electrical circuit connecting the first hydrophone to the second transducer for driving the second transducer, and a second electrical circuit connecting the second hydrophone to the first transducer for driving the first transducer.

8. An acoustic cloaking transducer system as set forth in claim 1 including a characteristic acoustic impedance, $\rho c/\eta$, with $\eta$ the transducer efficiency that is nearly acoustically matched to the medium of characteristic impedance $\rho c$, where $\rho$ is the density and $c$ is the sound speed, providing nearly complete transmission from front to back and back to front of the target.

9. An acoustic cloaking transducer system as set forth in claim 1 including a first hydrophone for sensing the impinging wave to control the rear transducer, and a second hydrophone for sending a reflected wave to control the front transducer said first hydrophone and first transducer each receiving portions of the impinging wave front, and the second hydrophone and second transducer each receiving portions of the re-transmitted wave front.

10. An acoustic cloaking transducer system as set forth in claim 9 including transducer electrical load impedances associated respectively with the front and rear transducers that create an impedance that is matched to the water through the transducers that absorb the incoming acoustic wave, amplifiers to increase the signal from the hydrophones, equalizers for uniform response and time delays to match the time of travel through the water or gas so as to provide active cloaking of the targeted object.

11. An acoustic cloaking transducer system as set forth in claim 9 wherein said electrical circuit means comprises a first electrical circuit connecting the first hydrophone to the second transducer for driving the second transducer, and a second electrical circuit connecting the second hydrophone to the first transducer for driving the first transducer, said first hydrophone being arranged adjacent to said first transducer for receiving the impinging wave front and said second hydrophone being arranged adjacent to said second transducer for receiving the re-transmitted wave front.

12. An electro-acoustic transducer system for cloaking a target having opposed one and other target ends, said system comprising: at least a first transducer disposed in front of and positioned on the one target end for receiving an input acoustic wave from a sonar source for absorbing the input acoustic wave; at least a second transducer disposed at the rear of and positioned on the other target end; a first hydrophone disposed in front of the target for receiving at least a portion of the input acoustic wave and including a first electrical circuit connected between the first hydrophone and the second transducer for driving the second transducer; a second hydrophone disposed at the rear of the target for receiving at least a portion of a reflected acoustic wave and including a second electrical circuit connected between the second hydrophone and the first transducer for driving the first transducer, and electrical circuit means disposed between the first and second transducers, said electrical circuit means including transducer electrical load impedances associated respectively with the front and rear transducers that create an impedance that is matched to the water through the transducers that absorb the incoming acoustic wave, amplifiers to increase the signal from the hydrophones, equalizers for uniform response and time delays to match the time of travel through the water or gas so as to provide active cloaking of the targeted object.

13. An electro-acoustic transducer system as set forth in claim 12 including a first amplifier coupled between the second hydrophone and the first transducer, and a second amplifier coupled between the first hydrophone and the second transducer.

14. An electro-acoustic transducer system as set forth in claim 12 wherein the first hydrophone is disposed in front of and adjacent to the first transducer and the second hydrophone is disposed behind and adjacent to the second transducer.

15. An electro-acoustic transducer system as set forth in claim 12 wherein the first transducer is tuned to the frequency of the sonar source, and the input acoustic wave is absorbed in the first transducer.

16. An electro-acoustic transducer system as set forth in claim 12 wherein both transducer include a matched impedance that functions as a matched load to the input wave and absorb the wave.

17. A method of cloaking a targeted object from an input electro-acoustic wave signal source in a transducer system that includes at least one pair of transducers, said targeted object to be cloaked having opposed respective front and rear ends, said pair of transducers including front and rear transducers that are positioned on the respective front and rear targeted object ends and electric circuit means disposed on the targeted object and inter-coupling the front and rear transducers, said method comprising the steps of: receiving the transmitted acoustic wave from the source at the front transducer so that the input wave is absorbed by the front transducer upon arriving at the targeted object, absorbing the transmitted wave at the front transducer, electrically coupling the signal received at the front transducer to the rear transducer via the electrical circuit means, retransmitting the received signal at the rear transducer from the rear end of the targeted object, directing the retransmitted signal at a reflection to pass on through the targeted object from the rear transducer via said electrical circuit means to said front transducer and emerge as a return wave front from the front transducer, as if the targeted object were not there.

18. The method of claim 17 wherein a portion of the wave that passes through the targeted object is also timed to emerge at the same time as another portion of the wave that passes around on the outside of the targeted object.

19. The method of claim 17 wherein the step of coupling the signal received at the front transducer to the rear transducer includes electrically coupling between the front transducer to the rear transducer by means of an electrical circuit.

20. The method of claim 19 wherein said electrical circuit coupling is by means of a first electrical circuit connecting the first hydrophone to the second transducer for driving the second transducer, and a second electrical circuit connecting the second hydrophone to the first transducer for driving the first transducer, said first hydrophone being arranged adjacent to said first transducer for receiving the impinging wave front and said second hydrophone being arranged adjacent to said second transducer for receiving the re-transmitted wave front.

21. The method of claim 17 wherein said pair of transducers comprises a matched pair of transducers.

* * * * *